July 22, 1969    R. B. SMITH    3,456,591
METER ASSEMBLY
Filed Aug. 4, 1967

INVENTOR
ROY B. SMITH

BY Whittemore, Hulbert & Belknap
ATTORNEYS

3,456,591
Patented July 22, 1969

3,456,591
METER ASSEMBLY
Roy B. Smith, Washington Court House, Ohio, assignor to Reef-Baker Corporation, East Detroit, Mich., a corporation of Michigan
Filed Aug. 4, 1967, Ser. No. 658,400
Int. Cl. F04b 17/00; F16n 11/10
U.S. Cl. 103—52                                    13 Claims

ABSTRACT OF THE DISCLOSURE

The metering device has a two-part valve body with a chamber therein. A valve is axially movable in the chamber relatively rapidly in one direction to pump a metered charge of oil through an outlet passage, and retracts relatively slowly. During retraction oil bypassed the valve through a small clearance around the periphery of the valve. The parts of the body are separable to permit removal and replacement of the valve.

SUMMARY OF THE INVENTION

It is a primary object of this invention to provide a metering device in a lubrication system for transmitting small, accurately metered charges of oil at periodic intervals.

Another object of the invention is to provide a metering device which will prevent syphoning between intermittent surges of pressure.

Another object is to provide a metering device in which one or both of the chamber-forming and valve members are removable from the metering device and replaceable by others of different dimensions.

Another object is to provide a metering device which is capable of long service without breakdown or the need for repair and yet which is of a relatively simple construction.

Another object is to provide a metering device which is extremely efficient in transmitting the pump pressure to the object being lubricated.

Other objects and features of the invention will become apparent as the description proceeds, especially when taken in conjunction with the accompanying drawings, wherein.

Figure 1:
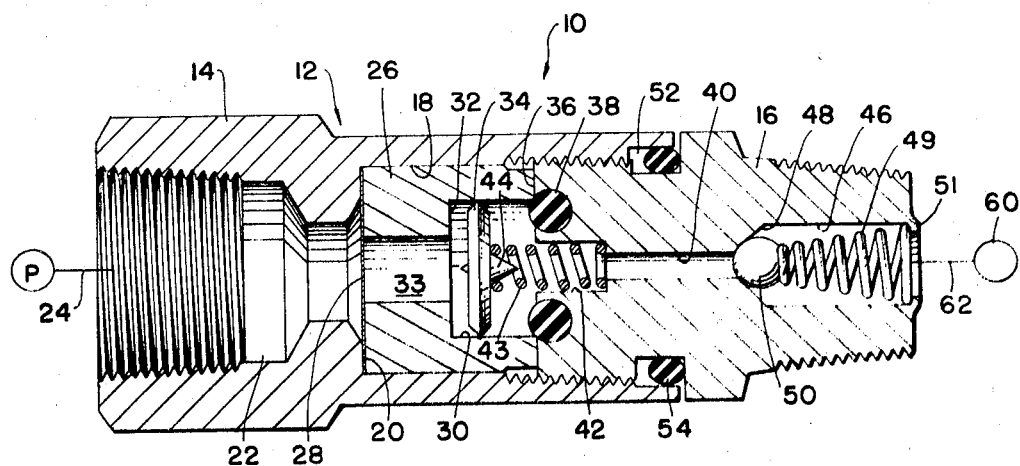
FIGURE 1 is a longitudinal sectional view of a metering device embodying my invention and showing the same in a diagrammatically illustrated lubrication system.

The lubrication system of the present invention may be used for any device or apparatus requiring lubrication. It may for example serve to lubricate a bearing or chassis part on a bus or other motor vehicle. Ordinarily there will be a separate metering device for each bearing or other point requiring lubrication.

The source of oil pressure is illustrated diagrammatically as a pump P. Any suitable means may be provided to control the operation of the pump so that periodic surges of pump pressure will be applied to the metering device 10. Thus for example the pump may be operated to deliver surges of pressure to the metering device of three seconds duration one or more times in every hour. In order to operate the pump periodically in the manner suggested, a suitable electric pulser and timer of standard construction may be employed, the details of construction of which are not a part of the present invention.

The metering device 10 comprises an elongated body 12 having an elongated tubular inlet body part 14 and an elongated tubular outlet body part 16. The inlet body part 14 has an elongated coaxial cylindrical cavity 18 extending from a point intermediate its length to its outer end. The outer end portion of this cavity is internally threaded and threadedly receives the inner end portion of the outer body part 16. The inner end portion of the cavity 18 is of smooth uniform circular cross section. The inner end of the cavity 18 is defined by a transverse wall 20 disposed at right angles to the longitudinal central axis of the body, and an oil inlet passage 22 extends from the inner end of the inlet body part to the cavity 18 through wall 20. This oil inlet passage is internally threaded for connection to a coupling for the line 24 leading from the pump P.

The cylindrical metering chamber member 26 fits in the cavity 18. This member has a side wall of uniform circular cross section in close fitting contact with the cylindrical wall of the cavity 18, and the inner end of the member 26 is disposed adjacent to the transverse wall or shoulder 20 in the body part 14. A screen 28 is clamped between the inner end of the member 26 and the transverse wall 20. The screen may for example be a 200-mesh screen and is designed to strain or exclude impurities from oil entering the metering device.

The member 26 has within it a coaxial chamber 30 of uniform circular cross section which is open at the outer end. The inner end of the chamber 30 is defined by a transverse wall 32 at right angles to the axis of the body and intermediate the ends of the member 26. A central passage 33 in the member 26 places the chamber 30 in communication with the oil inlet passage 22.

A circular valve 34 is disposed within the chamber 30. The valve 34 is in the form of a flat disk, and is only slightly smaller in diameter than the chamber 30 to provide a slight clearance. The difference in diameter between the valve 34 and the chamber 30 is preferably about .002 inch, providing a clearance of .001 inch. The valve 34 is capable of moving axially within the chamber 30, although when the valve moves slowly oil will bypass the valve through the slight clearance around its periphery. As shown, the valve is preferably peripherally feathered, that is reduced to a relatively sharp edge so as to preclude the accumulation of grit or foreign particles and also to prevent the valve from becoming cocked.

The inner end of the outer body part 16 is defined by a transverse wall 36 at right angles to the central axis of body, this wall abutting the outer end of the chamber member 26 and passing it inwardly toward the transverse wall 20 of the inner body part 14. The wall 36 defines the outer end of the chamber 30.

As seen, the inner end of the outer body part 16 has an annular recess in the wall 36 in which an O-ring 38 is disposed. During movement of the valve 34 to the right or in a pumping direction the valve comes in sealing contact with O-ring 38 to complete the pumping stroke.

The outer body part 16 has a central oil outlet passage 40. The inner end of this passage is enlarged as indicated at 42, and one end of a compression coil spring 43 is received in this enlarged portion 42 of the outlet passage. The opposite end of the compression coil spring bears against the valve member 34, urging it to the left in FIGURE 1 to retract it. The valve member has a central axial cone-shaped part 44 extending into the spring 43 to center it. The outer end portion of the oil outlet passage 40 is also enlarged as shown at 46, and at the inner end has a frusto-concial valve seat 48. A check valve in the form of the ball 50 is disposed in the enlargement 46 and is adapted to seat against the tapered seat 48 to close the outlet passage. A compression coil spring 49 has one end bearing against the ball valve 50 and its outer end engages an inturned flange 51 surrounding the enlargement 46 of the passage. The spring 49 urges the ball 50 toward its seated position illustrated in the drawings.

The outer end of the inner body part 14 is internally enlarged and the adjacent inner end of the outer body part 16 is externally reduced to provide an annular space 52 in which an O-ring seal 54 is disposed for sealing the inner and outer body parts against the escape of lubricant.

The point being lubricated may, as indicated, be considered to be a bearing on a bus, and is designated 60. A line 62 leads from the oil outlet passage 40 to the bearing 60.

In the operation of the device, it will be understood that between pressure surges, that is when the pump P is not operating, the pressures on opposite sides of the valve 34 will be substantially equal due to the fact that the oil in chamber 30 is capable of bypassing the valve 34 across the peripheral clearance. The spring 43 will force the valve 34 to the left against the inner transverse wall 32.

The return spring 43 needs to be only strong enough to retract the valve 34 against the end wall 32, it being understood that the pressures on opposite sides of the valve 34 will at this time be substantially equal although movement of the valve in the chamber may develop a slight differential pressure as oil is bypassed from one side of the valve to the other. The spring 49 for the ball valve 50, however, must be strong enough to hold the valve 50 closed against whatever residual pressure there may be in the system. Otherwise oil might bleed or syphon through the metering device to the bearing 60 between surges of pressure from the pump. Accordingly, it may be desirable to have a spring 49 for the ball valve 50 which is capable of closing the ball valve against a residual pressure for example of 100 p.s.i. in the metering device.

During those intervals when the pump is operated a surge of pressure will build up in the oil inlet passage 22. There may for example be a sudden or abrupt surge of pressure on the order of 1000 p.s.i. The result will be to cause a rapid movement of the valve 34 to the right to pump a charge of oil through the outlet passage and across the ball 50 to the bearing 60. The volume of oil thus pumped will be substantially equal to the volume of the chamber 30 on the right side of the valve 34 when retracted because the valve will move to the right through a pumping stroke until it contacts the O-ring 38. The surge of pressure is sufficiently abrupt and the movement of the valve 34 sufficiently rapid that virtually no lubricant will bypass the valve but rather will be pumped out through the outlet passage 40 to the bearing 60.

A pressure surge may last for a period of time on the order of approximately three seconds. The duration of the pressure surge must be sufficient to permit the lubricant to reach the bearing 60 which may be located a substantial distance, for example thirty feet, from the metering device. If the pressure surge were of too short a duration, the pressure would in all probability be dissipated before the charge of lubricant reached the point to be lubricated.

The valve body parts 14 and 16 may be readily unthreaded and separated from one another making it possible to replace either or both the chamber-forming member 26 and the valve 34. Obviously by substituting a chamber-forming member 26 having a chamber of a different dimension, for example longer or shorter, or substituting a valve which is thicker or thinner than the one shown, or by substituting a chamber-forming member and a valve both having different dimensions, the volume of the charge of lubricant pumped on each stroke of the valve can be varied.

Figure 2:
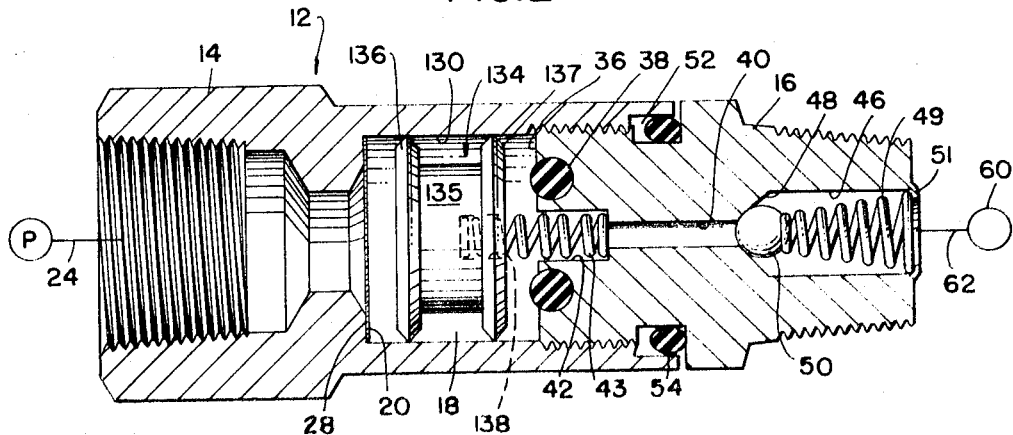
FIGURE 2 is a longitudinal section of a modified metering device.

FIGURE 2 illustrates a modified metering device in which corresponding parts are identified by the same characters of reference as employed in the embodiment disclosed in FIGURE 1. The metering device of FIGURE 2 differs from that of FIGURE 1 in that a separate chamber-forming member is not employed and the valve is of a different construction. It will be noted that the valve chamber 130 is provided by the inner end portion of the cavity 18 in the inlet body part 14. This chamber 130 is of smooth uniform circular cross section.

The valve 134 is an axially elongated member having an intermediate body portion 135 of reduced cylindrical form. At the two ends of the valve 134 are the circular disk-shaped elements 136 and 137 which extend at right angles to the axis of the metering device and individually are similar to the valve 34 in the first embodiment. These elements 136 and 137 may be formed integrally with the intermediate body portion 135 and their peripheries may be feathered to a narrow or sharp edge as shown to prevent the accumulation of foreign particles. The diameters of the elements 136 and 137 are preferably about .002 inch less than the diameter of chamber 130 to provide a clearance of .001 inch.

The spring 43 for retracting the valve 134 against the screen-covered transverse abutment 20 extends into a central recess 138 in the outer end of the valve.

With the exceptions noted, the construction of the metering device in FIGURE 2 is like that of the metering device in FIGURE 1 and may be substituted for the metering device in FIGURE 1 in the lubrication system there shown. The construction of the valve 134 obviously precludes cocking. It will be apparent that the valve 134 can be removed and replaced by another of different construction of different dimension by unscrewing the valve body parts 14 and 16.

The metering devices of this invention are very accurate in the charge of oil pumped or metered. Charges as small as .0003 cubic inch can be pumped, depending upon the dimensions of the valve and valve chamber. The metering devices also are extremely efficient in transmitting pressure from the pump to the point being lubricated, being capable of transmitting oil to the point being lubricated at pressures 93% to 98% of the pressure output of the pump.

What I claim as my invention is:

1. A metering device for transmitting metered charges of oil in a lubrication system comprising a body having a cylindrical chamber therein, a valve axially movable within said chamber, said body having an oil inlet passage to said chamber at one side of said valve and an oil outlet passage from said chamber at the opposite side of said valve, said valve being relatively rapidly movable axially in one direction to pump oil at said opposite side thereof out through said outlet passage in response to an abrupt pressure rise in the oil at said one side of said valve, means for moving said valve axially relatively slowly in the opposite direction in response to a drop in the oil pressure at said one side of said valve, bypass means for bypassing oil in said chamber past said valve during relatively slow axial movement thereof, and valve means for blocking flow of oil out through said outlet passage below a predetermined minimum pressure and for preventing reverse flow of oil in said outlet passage.

2. The metering device defined in claim 1, wherein said bypass means is provided by a small clearance between the periphery of said valve and the wall of said chamber.

3. The metering device defined in claim 1, wherein said valve is in the form of an axially elongated member having a transverse disk-shaped member at each end.

4. The metering device defined in claim 3, wherein the peripheries of said disk-shaped members are feathered to provide sharp edges avoiding the collection of grit, said bypass means including small clearances between the peripheries of said disk-shaped members and the wall of said chamber.

5. A metering device for transmitting metered charges of oil in a lubrication system comprising a body having a cylindrical chamber therein, a valve axially movable within said chamber, said body having an oil inlet passage to said chamber at one side of said valve and an oil outlet passage from said chamber at the opposite side of said valve, said valve being relatively rapidly movable axially in one direction to pump oil at said opposite side thereof out through said outlet passage in response to an abrupt pressure rise in the oil at said one side of said valve, means for moving said valve axially relatively slowly in the opposite direction in response to a drop in the oil pressure at said one side of said valve, bypass means for bypassing oil in said chamber past said valve during relatively slow axial movement thereof, said body being formed of separable parts, said chamber being opened when said body parts are separated to permit removal and replacement of said valve.

6. A metering device for transmitting metered charges of oil in a lubrication system comprising a body having a cylindrical chamber therein, a valve axially movable within said chamber, said body having an oil inlet passage to said chamber at one side of said valve and an oil outlet passage from said chamber at the opposite side of said valve, said valve being relatively rapidly movable axially in one direction to pump oil at said opposite side thereof out through said outlet passage in response to an abrupt pressure rise in the oil at said one side of said valve, means for moving said valve axially relatively slowly in the opposite direction in response to a drop in the oil pressure at said one side of said valve, said moving means including a spring in said body, there being a small clearance between the periphery of said valve and the wall of said chamber to bypass oil in said chamber past said valve during relatively slow axial movement thereof, the periphery of said valve being feathered to a narrow edge to prevent the accumulation of grit and to resist cocking, valve means for blocking the flow of oil out through said outlet passage below a predetermined minimum pressure and for preventing reverse flow of oil in said outlet passage, said valve means including a ball in said outlet passage and a seat in said outlet passge, and a spring urging said ball against said seat to close said outlet passage, and an O-ring in said chamber surrounding said outlet passage and against which said valve seals at the completion of a pumping stroke.

7. The metering device defined in claim 6, wherein said body is composed of separable parts, said chamber is formed in a separable member disposed in a cavity in said body, said chamber-forming member and said valve being removable and replaceable upon separation of said body parts.

8. A metering device for transmitting metered charges of oil in a lubrication system comprising a body having a cylindrical chamber therein, a valve axially movable within said chamber, said body having an oil inlet passage to said chamber at one side of said valve and an oil outlet passage from said chamber at the opposite side of said valve, said valve being relatively rapidly movable axially in one direction to pump oil at said opposite side thereof out through said outlet passage in response to an abrupt pressure rise in the oil at said one side of said valve, means for moving said valve axially relatively slowly in the opposite direction in response to a drop in the oil pressure at said one side of said valve, bypass means for bypassing oil in said chamber past said valve during relatively slow axial movement thereof, said body being formed of separable parts, said valve being removable and replaceable when said body parts are separated, said cylindrical chamber being formed in a separate member disposed within a cavity in said body, said separate chamber-forming member being removable and replaceable upon separation of said body parts.

9. A metering device for transmitting metered charges of oil in a lubrication system comprising a body having a cylindrical chamber therein, a valve axially movable within said chamber, said body having an oil inlet passage to said chamber at one side of said valve and an oil outlet passage from said chamber at the opposite side of said valve, said valve being relatively rapidly movable axially in one direction to pump oil at said opposite side thereof out through said outlet passage in response to an abrupt pressure rise in the oil at said one side of said valve, means for moving said valve axially relatively slowly in the opposite direction in response to a drop in the oil pressure at said one side of said valve, bypass means for bypassing oil in said chamber past said valve during relatively slow axial movement thereof, said body being formed of separable parts, said valve being removable and replaceable when said body parts are separated, said valve being in the form of a flat disk-shaped member disposed transversely with respect to said chamber, the periphery of said disk-shaped member being feathered to provide a sharp edge avoiding the collection of grit and also precluding cocking.

10. A metering device for transmitting metered charges of oil in a lubrication system comprising a body having a cylindrical chamber therein, a valve axially movable within said chamber, said body having an oil inlet passage to said chamber at one side of said valve and an oil outlet passage from said chamber at the opposite side of said valve, said valve being relatively rapidly movable axially in one direction to pump oil at said opposite side thereof out through said outlet passage in response to an abrupt pressure rise in the oil at said one side of said valve, means for moving said valve axially relatively slowly in the opposite direction in response to a drop in the oil pressure at said one side of said valve, bypass means for bypassing oil in said chamber past said valve during relatively slow axial movement thereof, said body being formed of separable parts, said valve being removable and replaceable when said body parts are separated, said valve being in the form of an axially elongated member having a transverse disk-shaped member at each end, the peripheries of said disk-shaped members being feathered to provide sharp edges avoiding the collection of grit.

11. The metering device defined in claim 10, wherein said valve comprises a flat disk-shaped member disposed transversely with respect to said chamber.

12. The metering device defined in claim 11, wherein the periphery of said disk-shaped member is feathered to provide a sharp edge avoiding the collection of grit.

13. The metering device defined in claim 12, wherein said bypass means includes a small clearance between the periphery of said disk-shaped member and the wall of said chamber.

References Cited

UNITED STATES PATENTS

| 458,450 | 8/1891 | Fitzgerald. |
| 1,186,487 | 6/1916 | McClelland _____ 184—29 |

ROBERT M. WALKER, Primary Examiner

U.S. Cl. X.R.

184—29